United States Patent [19]

Cirkel et al.

[11] Patent Number: 4,700,354

[45] Date of Patent: Oct. 13, 1987

[54] HIGH-ENERGY TE LASER SYSTEM

[75] Inventors: Hans-Jürgen Cirkel; Willi Bette, both of Erlangen, Fed. Rep. of Germany

[73] Assignee: Kraftwerk Union Aktiengesellschaft, Mülheim/Ruhr, Fed. Rep. of Germany

[21] Appl. No.: 794,955

[22] Filed: Nov. 4, 1985

Related U.S. Application Data

[63] Continuation of Ser. No. 484,622, Apr. 13, 1983.

[30] Foreign Application Priority Data

Apr. 16, 1982 [DE] Fed. Rep. of Germany ....... 3214062
Aug. 27, 1982 [DE] Fed. Rep. of Germany ....... 3232024

[51] Int. Cl.$^4$ ............................................. H01S 3/097
[52] U.S. Cl. ..................................................... 372/83
[58] Field of Search ............................................ 372/38

[56] References Cited

U.S. PATENT DOCUMENTS 3,815,047  6/1974  Smith et al. ........................... 372/83
4,130,809 12/1978  Hasson et al. ......................... 372/83

Primary Examiner—Robert E. Wise
Attorney, Agent, or Firm—Herbert L. Lerner; Laurence A. Greenberg

[57] ABSTRACT

A high-energy TE laser system, includes an excitation circuit having supply lines, a laser head having an optical axis, a laser chamber with a gas space formed therein, at least two laser electrodes being disposed opposite each other and spaced apart in the laser chamber parallel to the optical axis of the laser head for producing an arc-free capacitor discharge between the electrodes being as homogeneous as possible in the gas space for excitation, at least one rapid high-voltage switch, a pulse-forming network connected to the rapid high-voltage switch for producing high-voltage pulses at the laser electrodes with the rapid high-voltage switch, the pulse-forming network including first and second strip conductor capacitors respectively associated with the rapid high-voltage switch and with the laser head, and the pulse-forming network including first and second equivalent inductances of the excitation circuit formed of self-inductances of the high-voltage switch, the laser head, the supply lines of the excitation circuit and the strip conductor capacitors, the pulse-forming network being a Blümlein circuit for a given maximum build-up time of the high-voltage pulses produced at the laser electrodes, the first strip conductor capacitor having a capacitance being less than the capacitance of the second strip conductor capacitor by a factor $k<1$, and the first equivalent inductance being connected in series with the first strip conductor capacitor and having an inductance being greater than the inductance of the second equivalent inductance by a factor $1/k$. The pulse-forming network may also be a charge transfer circuit.

22 Claims, 12 Drawing Figures

HIGH-ENERGY TE LASER SYSTEM

This application is a continuation of application Ser. No. 484,622, filed Apr. 13, 1983.

The invention relates to a high-energy TE laser system for matching pulse-forming networks to the requirements of the excitation circuit of the system, comprising an excitation circuit having supply lines, a laser head having an optical axis, a laser chamber with a gas space formed therein, at least two laser electrodes being disposed opposite each other and spaced apart in the laser chamber parallel to the optical axis of the laser head and preferably having a solid section elongated parallel to the optical axis, for producing an arc-free capacitor discharge between the electrodes being as homogeneous as possible in the gas space for excitation, at least one rapid high-voltage switch, a pulse-forming network connected to the rapid high-voltage switch for producing, activating or firing high-voltage pulses at the laser electrodes with the rapid high-voltage switch, the pulse-forming network including first and second strip conductor capacitors respectively associated with the rapid high-voltage switch and with the laser head, and the pulse-forming network including first and second equivalent inductances of the excitation circuit formed of self-inductances of the high-voltage switch, the laser head, the supply lines of the excitation circuit and the strip conductor capacitors.

Such an apparatus is known from German Published, Non-Prosecuted DE-OS 29 32 781 corresponding to U.S. Pat. No. 4,365,337, except for the fact that the equivalent inductances of the exciter circuit are not included in the circuit diagrams of FIG. 1 for a Blümlein circuit and FIG. 4 for a charge-transfer circuit. However, consideration of these equivalent inductances is of fundamental importance for the present application.

For a detailed explanation of the term TE laser (TE=transversely excited), reference should be made to the above-mentioned German Published, Non-Prosecuted Application. Since these TE lasers, operate with pressures in the laser chamber of up to several bar, they are presently referred to as TE lasers and no longer as TEA lasers.

In this case and in the following it is assumed that the high-energy laser systems as described above are equipped with preionization devices, such as those which are described, for example, in German Published, Non-Prosecuted Application DE-OS 30 35 702 (creep spark discharge) or in German Published, Prosecuted Application DE-AS 30 35 730 corresponding to U.S. Application Ser. No. 303,167, filed Sept. 17, 1981 (preionization rods); a description of these devices within the present application is therefore unnecessary. The present application is concerned with the problem of finding a favorable construction for the pulse-forming network and the dimensions of its circuit elements within the framework of the exciter circuit, wherein it is understood that the exciter circuit includes both the pulse-forming network with its rapid high-voltage switch, as well as the laser head.

A particular problem which occurs with an apparatus as mentioned above, is that of maintaining the loading of the rapid high-voltage switch within tolerated limits, so that a service life which is too short need not be tolerated, although in this case the build-up time of the high-voltage pulses for the laser head must not exceed a maximum value. In this case, the ability to convert the highest possible proportion of energy stored in the pulse-forming network into optical energy at the laser electrodes, depends on producing a discharge which is as arc-free as possible.

The purpose of the invention is to provide means for matching the pulse-forming network to the requirements of the excitation circuit of a high-energy TE laser system, with which the indicated problems can be solved in a particularly favorable way. In this manner an undesired overloading of the rapid high-voltage switch is avoidable, a sufficiently short build-up time for the high voltage to be fed to the laser electrodes is provided, and a very favorable ratio of the high-voltage energy which can be exploited at the laser electrodes on one hand, to the energy fed into the pulse-forming network on the other hand, can be achieved.

It is accordingly an object of the invention to provide a high-energy TE laser sysem of the above-mentioned type, which overcomes the hereinafore-mentioned disadvantages of the heretofore-known devices of this general type.

With the foregoing and other objects in view there is provided, in accordance with the invention, a high-energy TE laser system for matching pulse-forming networks to the requirements of the excitation circuit of the system, comprising an excitation circuit having supply lines, a laser head having an optical axis, a laser chamber with a gas space formed therein, at least two laser electrodes being disposed opposite each other and spaced apart in the laser chamber parallel to the optical axis of the laser head and preferably having a solid section elongated parallel to the optical axis, for producing an arc-free capacitor discharge between the electrodes being as homogeneous as possible in the gas space for excitation, at least one rapid high-voltage switch, a pulse-forming network connected to the rapid high-voltage switch for producing, activating or firing high-voltage pulses at the laser electrodes with the rapid high-voltage switch, the pulse-forming network including first and second strip conductor capacitors respectively associated with the rapid high-voltage switch and with the laser head, and the pulse-forming network including first and second equivalent inductances of the excitation circuit formed of distributed self-inductances of the high-voltage switch, the laser head, the supply lines of the excitation circuit and the strip conductor capacitors, the pulse-forming network being a Blümlein circuit for a given maximum build-up time of the high-voltage pulses produced at the laser electrodes, the first strip conductor capacitor having a capacitance being less than the capacitance of the second strip conductor capacitor by a factor $k<1$, and the first equivalent inductance being connected in series with the first strip conductor capacitor and having an inductance being greater than the inductance of the second equivalent inductance by a factor $1/k$.

In accordance with another feature of the invention, the first equivalent inductance is connected between the rapid high-voltage switch and the first strip conductor capacitor, and the second equivalent inductance is connected in series with the second strip conductor capacitor.

In accordance with a further feature of the invention, the strip conductor capacitors include plates, coatings or electrodes, and dielectric layers disposed between the plates extended substantially normal to the optical axis of the laser head, forming a capacitor stack stacked in a stacking direction substantially parallel to the optical axis of the laser head, the plates being connected in the pulse-forming network.

In accordance with an added feature of the invention, there are provided laterally projecting connecting lugs connected between the plates and the pulse-forming network.

In accordance with an additional feature of the invention, the value of k is within the limits $0.5 \leq k \leq 1$.

In accordance with again another feature of the invention, the dielectric layer between the plates of the first strip conductor capacitor is thicker than the dielectric layer between the plates of the second strip conductor capacitor.

In accordance with again a further feature of the invention, the plates of the first strip conductor capacitor have a smaller surface area than the plates of the second strip capacitor.

In accordance with again an added feature of the invention, the dielectric or insulating layer disposed between the plates of the first strip conductor capacitor has a smaller dielectric constant than the dielectric layer disposed between the plates of the second strip conductor capacitor.

In accordance with again an additional feature of the invention, there is provided a high-energy TE laser system for matching pulse-forming networks to the requirements of the excitation circuit of the system, comprising an excitation circuit having supply lines, a laser head having an optical axis, a laser chamber with a gas space formed therein, at least two laser electrodes being disposed opposite each other and spaced apart in the laser chamber parallel to the optical axis of the laser head and preferably having a solid section elongated parallel to the optical axis for producing an arc-free capacitor discharge between the electrodes being as homogeneous as possible in the gas space for excitation, at least one rapid high-voltage switch, a pulse-forming network connected to the rapid high-voltage switch for producing, activating or firing high-voltage pulses at the laser electrodes with the rapid high-voltage switch, the pulse-forming network including first and second strip conductor capacitors respectively associated with the rapid high-voltage switch and with the laser head, and the pulse-forming network including first and second equivalent inductances of the excitation circuit formed of self-inductances of the high-voltage switch, the laser head, the supply lines of the excitation circuit and the strip conductor capacitors, the pulse forming network being a charge-transfer circuit, the strip conductor capacitors including plates, coatings or electrodes, and dielectric layers disposed between the plates extended substantially normal to the optical axis of the laser head, forming a capacitor stack stacked in a stacking direction substantially parallel to the optical axis of the laser head, the plates being connected in the pulse-forming network, and at least one of the following expressions is met:

$F_K \leq F_F$,
$d_K \geq d_F$,
$\epsilon_K \leq \epsilon_F$,
so that $$\epsilon_K \cdot \frac{F_K}{d_K} \leq \epsilon_F \cdot \frac{F_F}{d_F},$$

wherein $F_K$, $d_K$ and $\epsilon_K$ are the respective surface area of the plates, thickness of the dielectric layer and dielectric constants of the second strip conductor capacitor associated with the laser head, and $F_F$, $d_F$ and $\epsilon_F$ are the respective surface area of the plate, thickness of the dielectric layer and dielectric constant of the first strip conductor capacitor associated with the rapid high-voltage switch.

In accordance with yet another feature of the invention, there are provided laterally projecting connecting lugs connected between the plates and the pulse-forming network.

In accordance with yet a further feature of the invention, the strip conductor capacitors are in the form of respective capacitance units being adjacent each other in the stacking direction and being mirror-symmetrical relative to a plane of symmetry transverse to the stacking direction.

In accordance with yet an added feature of the invention, the strip conductor capacitors are in the form of respective capacitance units being successively adjacent each other in the stacking direction with the same orientation of the plates.

In accordance with yet an additional feature of the invention, the dielectric layers of the capacitance units of the capacitor stack are in the form of dielectric paste.

In accordance with still another feature of the invention, the dielectric layers of the capacitance units of the capacitor stack are in the form of dielectric fluid, especially chemically pure water.

In accordance with still a further feature of the invention, the dielectric layers of the capacitor stack are formed of solid insulating material.

In accordance with still an added feature of the invention, the plates are in the form of respective elongated unfolded plates common to both of the strip conductor capacitors of a capacitance unit, the capacitor stack has a substantially central opening formed therein extended along the stacking direction, the laser head is disposed in the opening and insulated from high voltage, and the rapid high-voltage switch or circuit section is disposed on the outer periphery of the capacitor stack.

In accordance with still an additional feature of the invention, the plates are in the form of respective elongated unfolded plates common to both of the strip conductor capacitors of a capacitor unit, the capacitor stack has a substantially central opening formed therein extended along the stacking direction, including a tube disposed in the opening, the rapid high voltage switch is disposed in the tube and insulated from high voltage, and the laser head or circuit section is disposed on the outer periphery of the capacitor stack.

In accordance with a concomitant feature of the invention, the plates of the capacitance units, especially in capacitor stacks having a dielectric in the form of water, and adjacent each other in the stacking direction and carrying the same potential, are structurally combined with each other forming common plates in a compact construction.

Other features which are considered as characteristic for the invention are set forth in the appended claims.

Although the invention is illustrated and described herein as embodied in a high-energy TE laser system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood when read in connection with the accompanying drawings, in which.

Numerous applications in the technical and industrial field stand out for transversely excited (TE) lasers (e.g. Exciter TE-CO$_2$ layers), so that questions of reliability and service life of the system are always becoming more important.

Besides electrical supply and control devices, gas circuits for the laser medium and cooling circuits, a TE laser system in principle is formed of a laser head, a pulse-forming network (PFN) for energy storage, and a rapid electrical high-voltage switching element, (e.g. spark gap, thyratron, or plasma switch).

The operation of a high power TE laser places extremely high demands on the high-voltage switching element, which must be reduced as far as possible in order to ensure reliable operation with a long service life.

Figure 1:
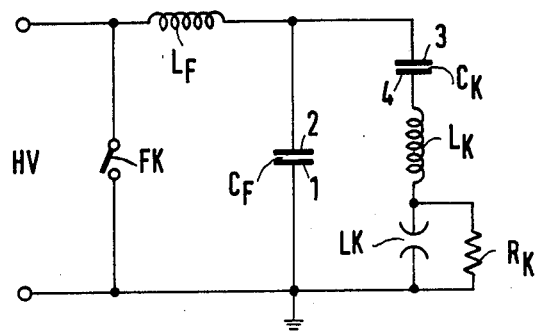
FIG. 1 is a schematic circuit diagram of an exciter circuit in Blümlein circuitry.

Referring now to the figures of the drawings in detail, and first particularly to FIG. 1 thereof, there is seen a Blümlein circuit which has proved to be a particularly favorable variation for the PFN of an exciter circuit for TE lasers. The laser system is formed of a switch FK, a laser chamber LK, an impedance $R_K$ and a pulse-forming network PFN. The pulse-forming network PFN is formed of capacitors $C_F$, $C_K$ and inductances $L_F$, $L_K$, which are provided by the distributed self-inductances of the switch, the laser chamber, the supply lines and the capacitors. The layers, sheets, plates or coatings of the capacitor $C_F$ are indicated by reference numerals 1, 2; those of capacitor $C_K$ by reference numerals 3, 4 and the high-voltage input terminals are indicated by reference symbols HV.

In order to achieve effective excitement of the laser gas contained in the laser chamber LK, an experimentally determined maximum build-up time $t_r$ of the voltage across the electrodes in the laser chamber must not be exceeded. The build-up time is proportional to $\sqrt{L_F \cdot C_F}$, wherein $t_r > \pi \sqrt{L_F \cdot C_F}$ must apply. When $C_F$ is given, $L_F$ is fixed by this relationship and the maximum current through the switch element amounts to:

$$U_o \cdot \sqrt{\frac{C_F}{L_F}} \ ;$$

where $U_o$ = charging voltage of the capacitors.

By reducing the capacitance $C_F$ to $k \cdot C_K$ ($0.5 \leq k \leq 1$) with a constant steady build-up time $t_r$, i.e. increasing from $L_F$ to $L_F/k$, the peak current at the switch element is reduced to $$U_o \cdot k \sqrt{\frac{C_F}{L_F}} \ .$$

Contrary to the symmetrical Blümlein circuit ($C_F = C_K$), the characteristic resistance is increased by a slight, tolerated extent in the asymmetrical Blümlein circuit ($C_F = k \cdot C_K$) for a range of values of $0.5 \leq k \leq 1$ in the exciter circuit for the laser, which is formed by a series connection of the capacitors $C_F$ and $C_K$, in which the inductance $L_K$ and the ohmic resistance of the laser discharge section lies in the series circuit. Values of $k < 0.5$ are also possible but lead to a greater increase in the characteristic resistance corresponding to the relation $$Z_K = \sqrt{\frac{L_K}{C_K}} \cdot \sqrt{\frac{1+K}{K}} \ .$$

The asymmetrical Blümlein circuit therefore considerably reduces the requirements placed on the switching element, so that the properties of the actual laser excitation circuit are only influenced by an immaterial amount.

The present invention provides a use for this knowledge in the system described in the German Published, Non-Prosecuted Application DE-OS 29 32 781 entitled "Exciter systems for rapid pulsed discharge and their use", corresponding to U.S. Pat. No. 4,365,337.

Figure 2:
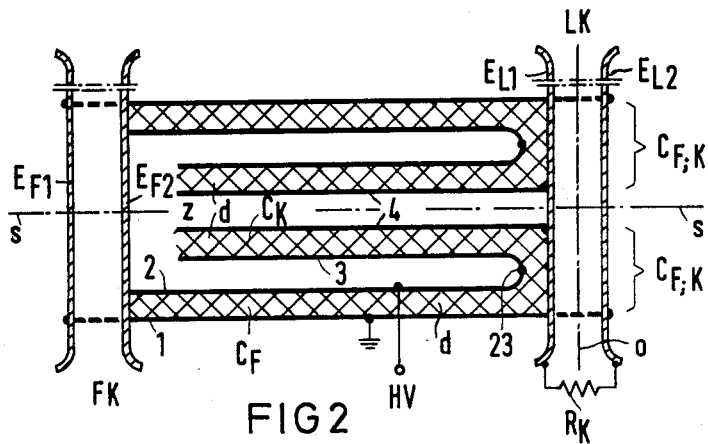
FIG. 2 is a fragmentary, diagrammatic, elevational view of the exciter circuit with strip-conductors stacked parallel to the axis of the laser, and tubular systems connected thereto of a high-voltage switch and a laser chamber.

Possible modifications of the pulse-forming networks are described according to FIG. 2, which corresponds to FIG. 2 of the above-mentioned patent. However, these modifications retain the principle advantages of the PFN described herein.

The insulating layer thickness of the capacitor $C_F$, formed by the electrodes or coatings 1, 2, may be increased as compared to the capacitor $C_K$, or the surface may be reduced, or a dielectric may be used with a lower dielectric constant as compared to the capacitor $C_K$. A combination of two or more of these measures is likewise possible.

Figure 3:
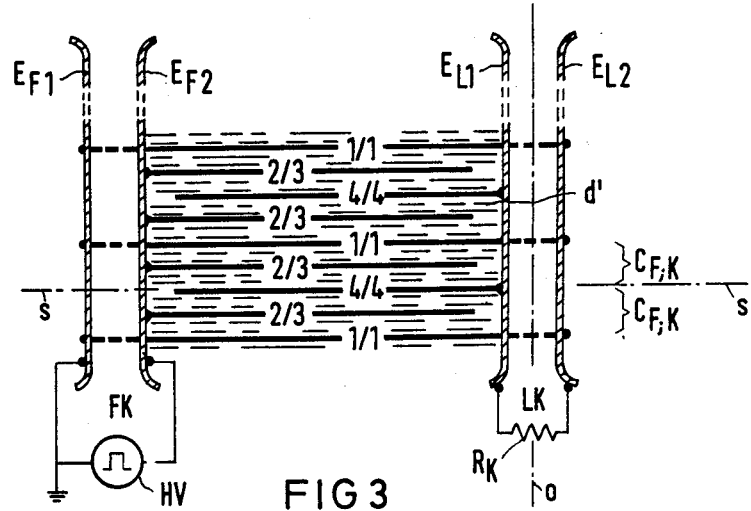
FIG. 3 is an elevational view corresponding to FIG. 2, of a laser apparatus in which fluid dielectric, especially water, is used for the strip-conductor capacitors.

By using water as a dielectric, or some other fluid dielectric, (as seen in FIG. 3 corresponding to FIG. 11 of the above-mentioned German Application DE-OS 29 32 781), the intended circuit variation can be achieved by a reduction in the surface of the plate 1/1 compared to the surface of the plates 2/3 and 4/4, or by increasing the distance from the plate 1/1 to the plate 2/3 relative to the distance from the plates 2/3 to 4/4. A combination of both measures is also possible. This construction is, of course, not limited to fluid dielectric but can also work with a solid or paste-like dielectric. The dielectric is shown in diagonal criss-cross-hatching in FIGs. 2, 4, 6, 9 and 12.

Figure 4:
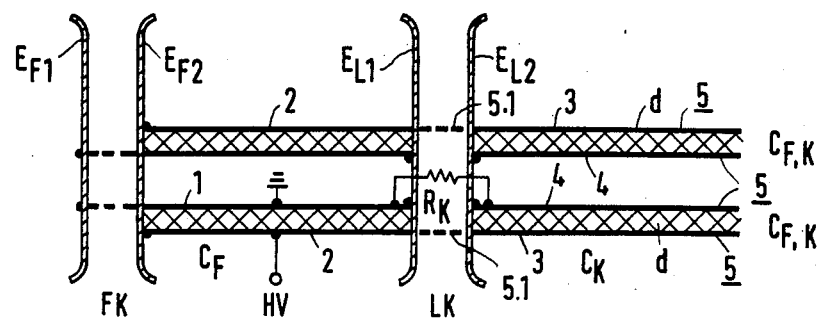
FIG. 4 is an elevational view of a third embodiment of an apparatus in the form of Blülein circuitry in which, as compared to FIG. 2, all the capacitor coatings, plates or armatures are unfolded and in parallel planes relative to each other and the laser chamber penetrates these through an opening.
Figure 9:
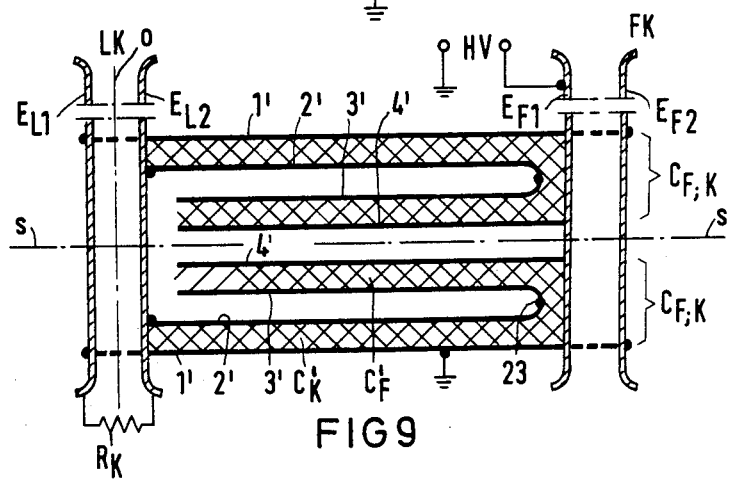
FIG. 9 is an elevational view of an apparatus for the exciter circuit according to FIG. 8 in a representation corresponding to that of FIG. 2.

A procedure can be followed according to the description for a solid dielectric in the construction described in FIG. 4 (corresponding to FIG. 9 of the above-mentioned German Application DE-OS 29 32 781).

Figure 5:
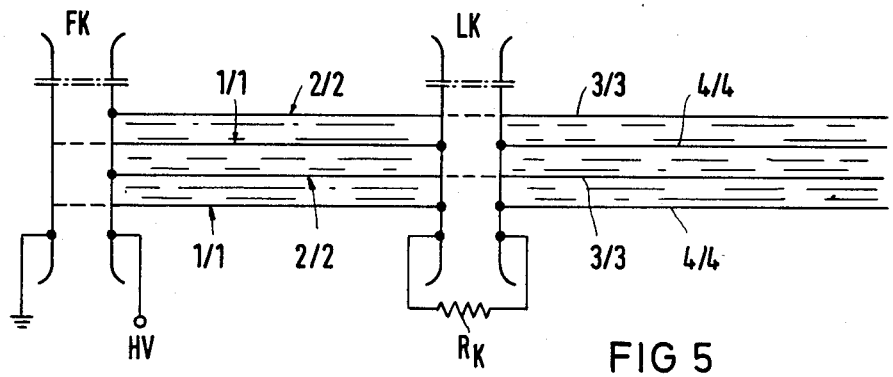
FIG. 5 is an elevational view of an apparatus according to FIG. 4, in which fluid dielectric, particularly water, is used in place of a solid insulating material.
Figure 11:
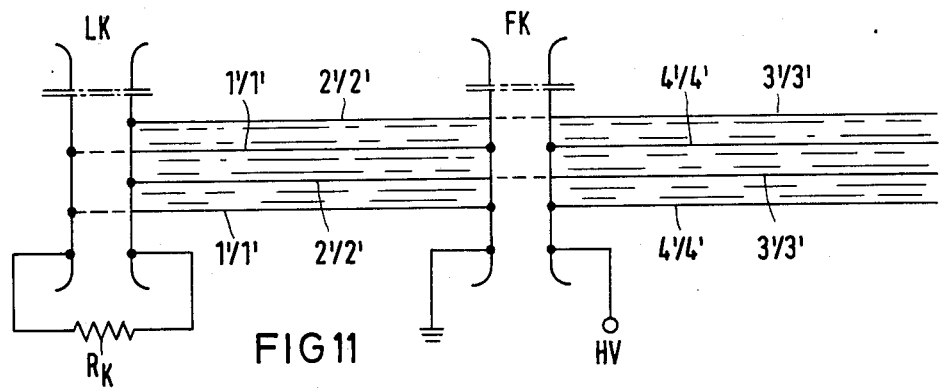
FIG. 11 is an elevational view of a second variation of FIG. 9 in a representation corresponding to FIG. 5, with capacitor electrodes in an exploded view, with a high-voltage switch disposed in an opening and with a fluid dielectric, particularly water.
Figure 12:
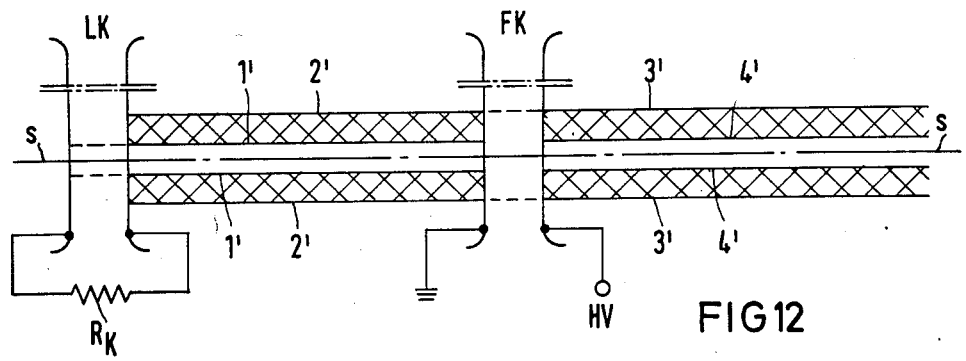
FIG. 12 is an elevational view of a variation of FIG. 11 with a solid insulating material as a dielectric in place of water.

An analogous conversion may also be adopted in this case if a fluid dielectric, particularly water, is used. FIG. 5 shows this construction. A space-saving construction of a high energy density is thereby achieved. This "elongated" structure can also be employed in charge-transfer circuitry and the case of identical surfaces and equal distances between the plates is also included. FIG. 11 shows the charge-transfer variation.

Figure 6:
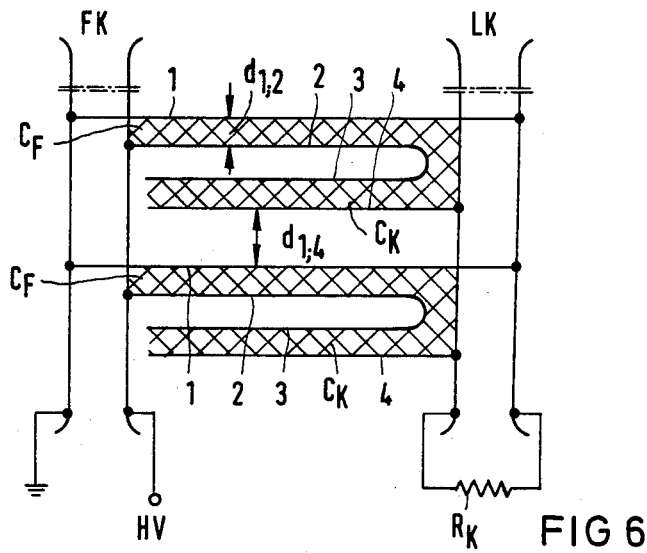
FIG. 6 is an elevational view of a fifth embodiment of an apparatus in Blümlein circuitry in which, contrary to the embodiment according to FIG. 2, the capacitance units, adjacent each other in the stacking direction, are not mirror-inverted relative to each other in sequence, but in the same direction, i.e. with the same orientation of their coatings.

A further possibility for achieving the advantages of the circuit described is shown in FIG. 6. The potential difference HV occurs between the capacitor electrodes or plates 1 and 2 as well as 3 and 4, and in the case of switching, the voltage between the electrodes or coatings 4 and 1 is maximally 2×HV. At least double the insulation distance $d_{1,4}$ compared to $d_{1,2}$ must therefore be selected between these two coatings. The surface of the capacitor $C_F$ formed in each case by the coatings 1, 2 must be smaller than or equal to $C_K$ formed by the electrodes or coatings 3, 4, the thickness of the insulating layer must be greater or equal, or the dielectric constant must be smaller or equal, wherein a combination of all or two of these measures is also possible.

Figure 7:
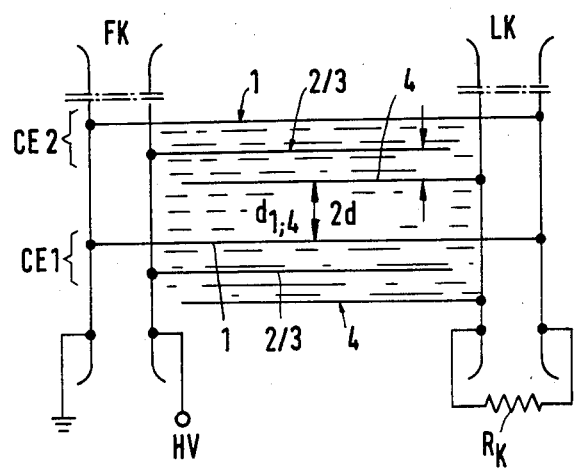
FIG. 7 is an elevational view of a variation of FIG. 6 in which a fluid dielectric, particularly water, is used in place of the solid dielectric for the stacked strip conductor capacity.

The case illustrated in FIG. 7 results from the use of a fluid dielectric, particularly water. The insulation distance between electrodes or coatings 1 and 2/3 as well as between electrodes 2/3 and 4 is indicated by reference symbol d, and the distance between the electrodes 1 and 4 of the adjacent capacitance units CE 1 and CE 2 facing each other is indicated by reference symbol $d_{1,4}$. Because of the maximum of 2×HV, $d_{1,4} \geq 2d$ should exist.

If the surface of the plate 1 is provided smaller than or equal to the surface of the plates 2 and 3 in the case of CE1, CE2, . . . etc., or the distance between the surfaces 1 and 2 is smaller or equal to the distance between the surfaces 2 and 3 in the case of CE1, CE2, . . . etc., or a combination of the two measures is chosen, then the desired circuit effect can also be achieved.

Figure 8:
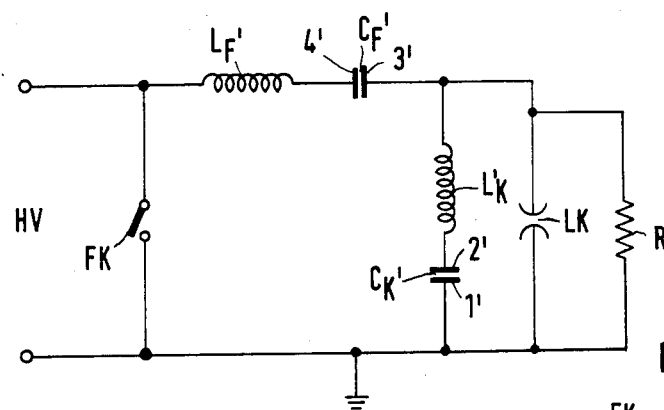
FIG. 8 is a schematic circuit diagram of an exciter circuit for a high-energy TE laser system with a charge-transfer circuit.

For example, the charge-transfer circuit appears to be favorable for the excitation of $CO_2$ lasers, as is shown in FIG. 8. The capacitor $C_F'$ is charged by the high-voltage source HV up to the voltage $U_o$. By closing the switch FK, which may be a thyratron, the initially unloaded capacitor $C_K'$ lying at ground potential is charged up to double the charging voltage, corresponding to the ratio of the capacitances $C_F'$ and $C_K'$ and the break-down voltage, i.e. the ignition voltage of the laser chamber LK. Advantageously, $C_K' \leq C_F'$, or respectively $C_K' << C_F'$ is chosen for the charge-transfer circuit. Possibilities for realizing this circuit are described in this application, which simultaneously maintain the advantages of the PFN, which were described in German Application DE-OS 29 32 781.

A possible embodiment is shown in FIG. 9, which corresponds to FIG. 5 of German Application DE-OS 29 32 781.

The surface of the electrodes or coatings 1', 2' is chosen smaller than or equal to the surface of the electrodes or coatings 3', 4', or respectively the thickness of the dielectric of the capacitor $C_K'$ is respectively chosen to be greater than or equal to the thickness of the capacitor $C_F'$, or the dielectric constant of the dielectric of the capacitor $C_K'$ is chosen to be smaller than or equal to the dielectric constant of the capacitor $C_F'$. A combination of all or two of these features is also possible.

Figure 10:
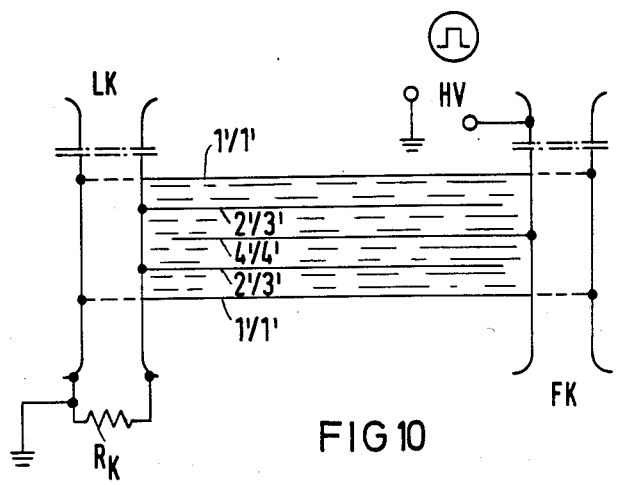
FIG. 10 is an elevational view of a variation of FIG. 9 in which again a fluid dielectric, in particular water, is used for the stacked strip conductor capacitor.

FIG. 10 shows a modification of the PFN with a fluid dielectric, particularly water, for the charge-transfer circuit. Coatings or electrodes to which the same potential is applied as in the illustration in FIG. 9, are assembled to form a plate, as is obvious from FIG. 10. In this construction, the surface of the plate 1'/1' is structured to be smaller than or equal to the surface of the plates 2'/3' and the plate 4'/4', or the distance between the plates 1'/1' and 2'/3' is chosen to be greater than or equal to the distance between the plates 2'/3' and the plate 4'/4'. A combination of the two embodiments is also possible.

A further possibility for constructing the PFN is illustrated in FIG. 11, which again is concerned with an "elongated" structure.

The surface 1'/1' is chosen to be smaller than or equal to the surfaces of the plates 3'/3' and 4'/4', or the distance between the plates 1'/1' and 2'/2' is greater than or equal to the distance between the plates 4'/4' and 3'/3', or a combination of both measures may also be used to obtain the desired effect. The circuit according to FIG. 12 can be constructed with the use of solid-body capacitors. In the case of this construction, the surface of the coatings or electrodes 1' and 2' is chosen to be smaller than or equal to those of the coatings or electrodes 3' and 4', or the distance of the dielectric between the electrodes 1' and 2' is greater than or equal to the distances between the electrodes 3' and 4', or the dielectric constant between the electrodes 1' and 2' is chosen to be smaller than or equal to that between the electrodes 3' and 4'. A combination of these variations is also possible.

In accordance with the limits of current capacity of an individual switching element, one switching element in each case is assigned to one or more stacks of capacitor parts for all circuit variations, as described in German Application DE-OS 29 32 781.

The foregoing is a description corresponding to German Application P 32 14 062.2, filed Apr. 16, 1982 and P 32 32 024.8, filed Aug. 27, 1982, the International priority of which is being claimed for the instant application and which is hereby made part of this application. Any discrepancies between the foregoing specification and the second mentioned corresponding German application are to be resolved in favor of the latter.

We claim:

1. Excitation circuit for TE high-energy laser, comprising: a laser chamber having an optical axis and including a gas space formed therein, at least two laser electrodes being disposed opposite each other and spaced apart in said laser chamber parallel to said optical axis for producing a highly homogeneous arc-free capacitor discharge between said electrodes in said gas space for excitation;

a pulse-forming network having supply lines, said supply lines being connected to a high-voltage source, said pulse-forming network and said TE high-energy laser forming together said excitation circuit, said pulse-forming network further comprising:

at least one rapid high-voltage switch being connected to the positive and negative pole of said high-voltage source, respectively, said rapid high-voltage switch being activatable for energizing said pulse-forming network to generate high-voltage pulses at the laser electrodes;

an impedance connected in parallel with the discharge gap of the laser chamber;

first and second stripline capacitors connected with said high voltage switch and the laser chamber forming a Blumlein circuit;

first and second respective equivalent inductances of the pulse-forming network formed from the self-inductance $L_F$, $L_K$ of the high voltage switch, the laser chamber, the leads of the circuit and the stripline capacitors;

said second equivalent inductance being connected in series with the discharge gap of the laser chamber and with the second stripline capacitor, said inductance together with said impedance forming a series-parallel branch;

said first equivalent inductance forming a series-parallel circuit in series with a parallel circuit including said series-parallel branch and the first stripline capacitor, the latter bridging said series-parallel branch;

the excitation circuit being completed by connecting inparallel the high-voltage switch and said series-parallel circuit of said first equivalent inductance and said first stripline capacitor bridging said series-parallel branch;

said pulse-forming network for a given maximum build-up time of said high-voltage pulses produced at said laser electrodes being provided with a first stripline capacitor having a capacitance $C_F$ being less than the capacitance of said second stripline capacitor $C_K$ by a factor $k<1$, and said first equivalent inductance having its inductance increased by a factor $1/k$ relative to the second equivalent inductance, thereby reducing the peak value of the current flow through the high-voltage switch according to the equation $$I_{max} = U_0 K \sqrt{\frac{C_F}{L_F}} ;$$

wherein $U_0$ is the charging voltage of the stripline capacitors; and maintaining the rising time value $t_r$ according to the unbalanced inequality $$t_r > \pi \sqrt{L_F \cdot C_F}$$

substantially at the same level as compared to a pulse-forming network having equal capacitance values of the first and the second stripline capacitor $C_F$ and $C_K$.

2. Laser system according to claim 1, wherein said first equivalent inductance is connected between said rapid high-voltage switch and said first strip conductor capacitor, and said second equivalent inductance is connected in series with said second strip conductor capacitor.

3. Laser system according to claim 1, wherein said strip conductor capacitors include plates and dielectric layers disposed between said plates extended substantially normal to the optical axis of said laser head, forming a capacitor stack stacked in a stacking direction substantially parallel to the optical axis of said laser head, said plates being connected in said pulse-forming network.

4. Laser system according to claim 3, wherein said dielectric layer between said plates of said first strip conductor capacitor is thicker than said dielectric layer between said plates of said second strip conductor capacitor.

5. Laser system according to claim 3, wherein said plates of said first strip conductor capacitor have a smaller surface area than said plates of said second strip capacitor.

6. Laser system according to claim 3, wherein said dielectric layer disposed between said plates of said first strip conductor capacitor has a smaller dielectric constant than said dielectric layer disposed between said plates of said second strip conductor capacitor.

7. Laser system according to claim 3, wherein said strip conductor capacitors are in the form of respective capacitance units being adjacent each other in said stacking direction and being mirror-symmetrical relative to a plane of symmetry transverse to said stacking direction.

8. Laser system according to claim 7, wherein said plates of said capacitance units adjacent each other in said stacking direction and carrying the same potential, are structurally combined with each other forming common plates in a compact construction.

9. Laser system according to claim 3, wherein said strip conductor capacitors are in the form of respective capacitance units being successively adjacent each other in said stacking direction with the same orientation of said plates.

10. Laser system according to claim 9, wherein said dielectric layers of said capacitance units of said capacitor stack are in the form of dielectric paste.

11. Laser system according to claim 9, wherein said dielectric layers of said capacitance units of said capacitor stack are in the form of dielectric fluid.

12. Laser system according to claim 9, wherein said dielectric layers of said capacitor stack are formed of solid insulating material.

13. Laser system according to claim 3, wherein said plates are in the form of respective elongated unfolded plates common to both of said strip conductor capacitors, said capacitor stack has a substantially central opening formed therein extended along said stacking direction, said laser head is disposed in said opening and insulated from high voltage, and said rapid high-voltage switch is disposed on the outer periphery of said capacitor stack.

14. Laser system according to claim 3, wherein said plates are in the form of respective elongated unfolded plates common to both of said strip conductor capacitors, said capacitor stack has a substantially central opening formed therein extended along said stacking direction; including a tube disposed in said opening, said rapid high voltage switch is disposed in said tube and insulated from high voltage, and said laser head is disposed on the outer periphery of said capacitor stack.

15. Laser system according to claim 1, wherein the value of k is within the limits $0.5 \leq k \leq 1$.

16. Excitation circuit for a TE high-energy laser system, comprising
a laser chamber having an optical axis and including a gas space formed therein, at least two laser electrodes being disposed opposite each other and spaced apart in said laser chamber parallel to said optical axis for producing a highly homogeneous arc-free capacitor discharge between said electrodes in said gas space for excitation;
a pulse-forming network having supply lines, said supply lines being connected to a high-voltage source, said pulse-forming network and said TE high-energy laser forming together said excitation circuit, said pulse-forming network further comprising:
at least one rapid high-voltage switch being connected to the positive and negative pole of said high-voltage source, respectively, said rapid high-voltage switch being activatable for energizing said pulse-forming network to generate high-voltage pulses at the laser electrodes;
an impedance connected in parallel with the discharge gap of the laser chamber;
first and second stripline capacitors connected with said high-voltage switch and the laser chamber forming a charge transfer-circuit;
first and second respective equivalent inductances $L_K'$ and $L_F'$ of the pulse-forming network formed from the self inductance of the high-voltage switch, the laser chamber, the leads of the circuit and the stripline capacitors;
said first equivalent inductance being connected in series with the first stripline capacitor, forming a first series-connection, and the two parallel branches of the laser chamber and the corresponding impedance forming a parallel circuit;
said second equivalent inductance being connected in series with the second stripline capacitor, this second series-connection being connected in series with said parallel circuit, thereby forming a series-parallel circuit;
the excitation circuit being completed by connecting inparallel with the high-voltage switch and said series-parallel circuit of said second series-connection and of said parallel circuit;
said strip line capacitors including plates and dielectric layers disposed between said plates extended substantially normal to the optical axis of said laser chamber forming a capacitor stack stacked in a stacking direction substantially parallel to the optical axis of said laser chamber, said plates being connected by said pulse-forming network, and meeting at least one of the following expressions:
$F_K \leq F_F$;
$d_K \geq d_F$;
$\epsilon_K \leq \epsilon_F$;
so that $$\epsilon_K \cdot \frac{F_K}{d_K} \leq \epsilon_F \cdot \frac{F_F}{d_F},$$

wherein $F_K$, $d_K$ and $\epsilon_K$ are respectively the surface area of said plates, the thickness of said dielectric layer and the dielectric constant of said first stripline capacitor associated with said laser chamber, and $F_F$, $d_F$ and $\epsilon_F$ are respectively the surface area of said plates, the thickness of said dielectric layer and the dielectric constant of said second stripline capacitor associated with said rapid high-voltage switch.

17. Laser system according to claim 16, wherein said strip conductor capacitors are in the form of respective capacitance units being adjacent each other in said stacking direction and being mirror-symmetrical relative to a plane of symmetry transverse to said stacking direction.

18. Laser system according to claim 17, wherein said plates of said capacitance units adjacent each other in said stacking direction and carrying the same potential, are structurally combined with each other forming common plates in a compact construction.

19. Laser system according to claim 16, wherein said strip conductor capacitors are in the form of respective capacitance units being successively adjacent each other in said stacking direction with the same orientation of said plates.

20. Laser system according to claim 19, wherein said dielectric layers of said capacitance units of said capacitor stack are in the form of dielectric paste.

21. Laser system according to claim 19, wherein said dielectric layers of said capacitance units of said capacitor stack are in the form of dielectric fluid.

22. Laser system according to claim 19, wherein said dielectric layers of said capacitor stack are formed of solid insulating material.

* * * * *